(12) United States Patent
Grimm et al.

(10) Patent No.: US 12,296,309 B2
(45) Date of Patent: May 13, 2025

(54) METHOD FOR FEEDING SOLID MATERIAL TO A MIXING DEVICE, SOLID-MATERIAL FEEDING DEVICE AND MIXING ASSEMBLY

(71) Applicant: IKA—WERKE GMBH & CO. KG, Staufen (DE)

(72) Inventors: Uwe Grimm, Staufen (DE); Andreas Otte, Staufen (DE)

(73) Assignee: IKA—WERKE GMBH & CO. KG, Staufen (DE)

( * ) Notice: Subject to any disclaimer, the term of this patent is extended or adjusted under 35 U.S.C. 154(b) by 910 days.

(21) Appl. No.: 17/421,642

(22) PCT Filed: Jan. 9, 2020

(86) PCT No.: PCT/EP2020/050423
§ 371 (c)(1),
(2) Date: Jul. 8, 2021

(87) PCT Pub. No.: WO2020/144276
PCT Pub. Date: Jul. 16, 2020

(65) Prior Publication Data
US 2022/0088553 A1    Mar. 24, 2022

(30) Foreign Application Priority Data

Jan. 11, 2019  (DE) .................. 10 2019 100 619.8
Jan. 29, 2019  (DE) .................. 10 2019 102 183.9

(51) Int. Cl.
*B01F 35/12*    (2022.01)
*B01F 23/50*    (2022.01)
(Continued)

(52) U.S. Cl.
CPC ........... *B01F 35/122* (2022.01); *B01F 23/53* (2022.01); *B01F 23/59* (2022.01); *B01F 27/271* (2022.01);
(Continued)

(58) Field of Classification Search
CPC .. B65G 53/4683; B65G 53/521; B65G 53/46; B01F 35/122
See application file for complete search history.

(56) References Cited

U.S. PATENT DOCUMENTS

| 1,974,789 A | 9/1934 | Angell |
| 2,906,417 A | 9/1959 | Rossi |

(Continued)

FOREIGN PATENT DOCUMENTS

| DE | 19528636 A1 | 2/1997 |
| DE | 102015110865 A1 | 1/2017 |

(Continued)

OTHER PUBLICATIONS

Corresponding Japanese Office Action dated Dec. 26, 2023.
International Search Report from corresponding PCT application No. PCT/EP2020/050423 dated Mar. 25, 2020.

*Primary Examiner* — Elizabeth Insler
(74) *Attorney, Agent, or Firm* — Grogan, Tuccillo & Vanderleeden, LLP

(57) ABSTRACT

The invention relates to improvements in the technical field of feeding solid materials to mixing devices. For this purpose, the solid-material feeding device, inter alia, is proposed. The solid-material feeding device comprises the slide, which can be moved between a first end position and a second end position through a conveying connection, which is arranged between a funnel and a solid-material outlet of the solid-material feeding device. By means of the slide, adhesions within the conveying connection can be loosened without having to remove the conveying connection.

3 Claims, 2 Drawing Sheets

Figure 1:
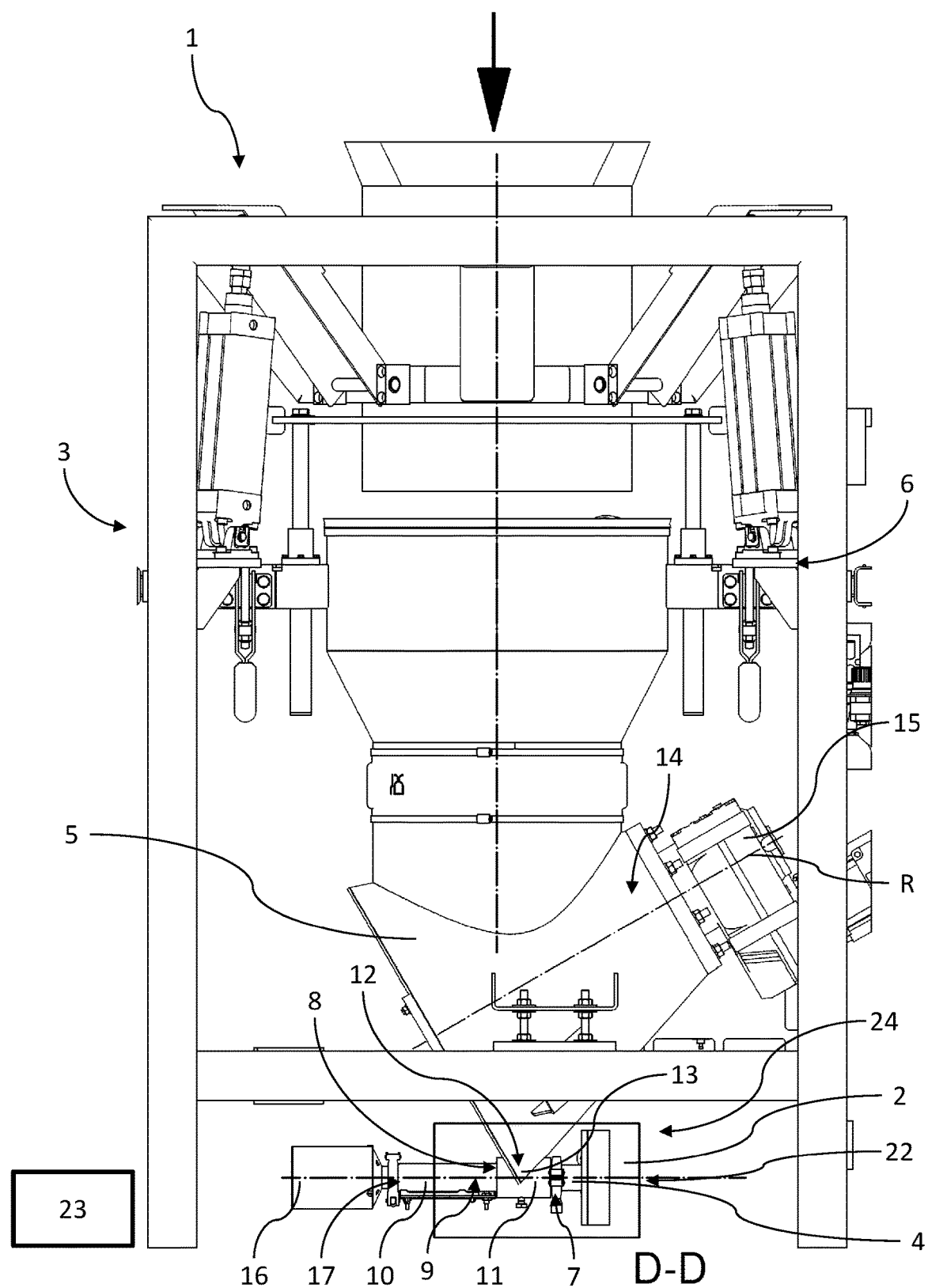

(51) Int. Cl.
*B01F 23/53* (2022.01)
*B01F 27/271* (2022.01)
*B01F 35/21* (2022.01)
*B01F 35/212* (2022.01)
*B01F 35/71* (2022.01)
*B65G 43/00* (2006.01)
*B65G 47/19* (2006.01)
*B65G 53/46* (2006.01)
*B65G 53/52* (2006.01)
*B01F 101/06* (2022.01)
*B01F 101/22* (2022.01)

(52) U.S. Cl.
CPC ........ *B01F 35/2113* (2022.01); *B01F 35/212* (2022.01); *B01F 35/71731* (2022.01); *B01F 35/718* (2022.01); *B65G 43/00* (2013.01); *B65G 47/19* (2013.01); *B65G 53/4683* (2013.01); *B65G 53/521* (2013.01); *B01F 2101/06* (2022.01); *B01F 2101/22* (2022.01)

(56) References Cited

U.S. PATENT DOCUMENTS

| | | | | |
|---|---|---|---|---|
| 5,150,990 | A | * | 9/1992 | Morimoto ............ B65G 53/521 406/25 |
| 6,764,253 | B1 | * | 7/2004 | Pfeiffer ................ B65G 53/521 406/89 |

FOREIGN PATENT DOCUMENTS

| | | |
|---|---|---|
| EP | 0438728 B1 | 7/1991 |
| EP | 1197260 A1 | 4/2002 |
| JP | S58114224 A | 7/1983 |
| JP | S62218327 A | 9/1987 |
| JP | H05147733 A | 6/1993 |
| JP | 2006008304 A | 1/2006 |
| JP | 2013035030 A | 2/2013 |
| WO | 2008098706 A1 | 8/2008 |

* cited by examiner

METHOD FOR FEEDING SOLID MATERIAL TO A MIXING DEVICE, SOLID-MATERIAL FEEDING DEVICE AND MIXING ASSEMBLY

CROSS-REFERENCE TO RELATED APPLICATIONS

This application is a national stage of International Application No. PCT/EP2020/050423, filed on Jan. 9, 2020, which claims priority to German Patent Application No. 102019100619.8 filed on Jan. 11, 2019, and German Patent Application No. 102019102183.9, filed on Jan. 29, 2019, all of which are hereby incorporated by reference in their entireties.

BACKGROUND

The invention relates to a method for feeding solid material to a mixing apparatus with the use of a solid material feeding apparatus. Furthermore, the invention relates to a solid material feeding apparatus for feeding solid material, in particular bulk material, such as, for example, powder, to a mixing apparatus, the solid material feeding apparatus having a funnel for receiving solid material and a solid material outlet which can be connected to a solid material inlet of a mixing apparatus, the solid material outlet and the funnel being connected to one another via a conveying connection.

Furthermore, the invention relates to a mixing arrangement with at least one mixing apparatus and at least one solid material feeding apparatus, and to the use of a solid material feeding apparatus and/or a mixing arrangement in the case of a method of the type mentioned at the outset.

Solid material feeding apparatuses are previously known in practice and also from the documents of the prior art, for example from documents WO 2008/098 706 A1, EP 1 197 260 A1, DE 10 2015 110 865 A1, U.S. Pat. No. 1,974,789 A and JP 2013 035 030 A, in various embodiments. They are used to receive solid materials, for example powders or granulates, and to feed them to a downstream mixing apparatus.

The mixing apparatuses which are operated together with solid material feeding apparatuses of this type in what are known as mixing arrangements are frequently solid/liquid mixing apparatuses which are used to introduce solid materials into a liquid and to mix them as homogeneously as possible with the latter.

For the supply of solid material, that is to say in order to transfer the solid materials to the solid material feeding apparatus, what are known as suction lances, sack emptying boxes or big bag emptying stations are frequently used.

With the aid of the solid material feeding apparatuses, the solid materials are then fed to the mixing apparatuses which are arranged downstream. Depending on the flow properties of the solid materials to be fed, this feeding sometimes succeeds well, sometimes less well. In the case of satisfactorily flowing solid materials or powders, the feeding as a rule succeeds without problems. There are also other solid materials, in particular powders, however, which have poor flow properties and promote clogging of those elements of the solid material feeding apparatuses which are involved in the feeding.

The feeding of poorly flowing powders, powders which tend to form clumps, powders which tend to compact, or else the feeding of grainy and adhesive powders such as, for example, titanium dioxide is particularly problematic.

In order to release adhesions or clumps in the region of the funnel of a solid material feeding apparatus of this type, it is known, for example, for pneumatic knockers or vibrators to be used. By way of said previously known measures, even very difficult solid materials can be loosened in such a way that adhesions and clogging in the region of the funnel can be largely avoided.

The conveying connection which is downstream of the funnel is as a rule not included by the vibrations and shocks which are transmitted to the funnel by way of knockers and vibrators of this type. Therefore, the feeding of solid materials through the conveying connection which is necessary between the funnel and the solid material outlet of the solid material feeding apparatus remains problematic. By way of the concepts known up to now, solid material adhesions within the conveying connection between the funnel and the solid material outlet of the solid material feeding apparatuses cannot be prevented satisfactorily and can certainly not be detached.

SUMMARY

It is therefore an object of the invention to provide a method, a solid material feeding apparatus and a mixing arrangement of the type mentioned at the outset which avoid the abovementioned problems and simplify the feeding of solid materials.

In order to achieve the object, first of all a method with the means and features of the independent claim which is directed to a method for feeding solid material to a mixing apparatus is proposed. In particular, in order to achieve the object, a method for feeding solid material, for example bulk material, such as powder, to a mixing apparatus with the use of a solid material feeding apparatus is therefore proposed. The solid material feeding apparatus comprises a funnel for receiving solid material and a solid material outlet which is connected to a solid material inlet of the mixing apparatus, to which the solid material is to be fed. The solid material outlet and the funnel are connected to one another via a conveying connection of the solid material feeding apparatus. The solid material is fed via the conveying connection to the mixing apparatus, here, in particular, to a mixing chamber of the mixing apparatus. The solid material feeding apparatus has a slide which can be moved through the conveying connection between a first end position and a second end position, and is set up to detach adhesions of solid material within the conveying connection. According to the invention, the slide is activated and is moved through the conveying connection, in order to clear the conveying connection, as soon as the conveying connection is clogged between the solid material outlet and the funnel.

Adhesions of solid material which can be deposited within the conveying connection of the solid material feeding apparatus can thus be removed in a particularly simple manner and without dismantling of the conveying connection.

It is provided in the case of one embodiment of the method for the solid material to be conveyed, in particular sucked, with the aid of vacuum into the mixing apparatus, in particular, into a mixing chamber of the mixing apparatus here. The vacuum, by way of which the solid material can be fed to the mixing apparatus, can be generated, for example, by way of a rotor/stator unit of the mixing apparatus. The rotor/stator unit can be arranged in a (for example, in the abovementioned) mixing chamber of the mixing apparatus.

With the aid of the vacuum, the solid material can be sucked in through the conveying connection of the solid material feeding apparatus into the mixing chamber of the mixing apparatus. A continuous pressure connection can be open between the mixing chamber of the mixing apparatus and the funnel of the solid material feeding apparatus during the feeding of the solid material through the conveying connection into the mixing chamber, which continuous pressure connection is not impaired by way of the slide. Only in the case of clogging of the conveying connection is the slide activated and moved through the conveying connection in order to clear the conveying connection.

Clogging of the conveying connection is detected according to the invention by way of a monitoring apparatus. The monitoring apparatus can be a monitoring apparatus of the solid material feeding apparatus. The monitoring apparatus activates the slide, in particular a slide drive of the solid material feeding apparatus, at least indirectly, as soon as clogging of the conveying connection is detected. An automated performance of the method is possible in this way. As soon as clogging of the conveying connection is determined by the monitoring apparatus, the latter can automatically activate the slide, in particular a slide drive, at least indirectly, as a result of which the slide is moved through the conveying connection, in order to detach any clogging and to free the conveying connection from adhesions.

In the case of one embodiment of the method, clogging of the conveying connection can be detected on the basis of a drop in the power consumption of a drive of the rotor/stator unit of the mixing apparatus. In addition or as an alternative to this, it is also possible for clogging of the conveying connection to be detected by way of a monitoring sensor of the monitoring apparatus. In the case of one embodiment of the method, clogging of the conveying connection is detected on the basis of a pressure change in the mixing apparatus, in particular on the basis of a pressure change in the mixing chamber of the mixing apparatus. To this end, for example, a monitoring sensor in the form of a pressure sensor can be used which is arranged in the mixing chamber or in the region of the mixing chamber or in the conveying connection. If the conveying connection is clogged, a pressure drop can be registered by way of the pressure sensor. A defined pressure drop, for example in the mixing chamber, can indicate clogging of the conveying connection. A sensor signal which is generated by a corresponding monitoring sensor can be utilized by the monitoring apparatus to at least indirectly activate the slide, in particular a slide drive, in order to move the slide through the conveying connection. The conveying connection can thus be cleared in an automated manner in the case of clogging, and the method can be carried out in an automated manner.

In order to achieve said object, furthermore, a solid material feeding apparatus with the features of the independent claim which is directed to a solid material feeding apparatus of this type is proposed. The object is therefore achieved, in particular, by virtue of the fact that the solid material feeding apparatus has a slide which can be moved through the conveying connection between a first end position and a second end position.

With the aid of the slide, the above-described adhesions of solid material within the conveying connection can be avoided and/or detached reliably. As soon as it is determined that the conveying connection is clogged between the solid material outlet and the funnel of the solid material feeding apparatus, the slide can be activated and can be used by way of its movement between the two end positions for clearing the conveying connection. In order to move the slide through the conveying connection between its end positions, a slide drive of the solid material feeding apparatus can be activated.

In the first end position, the slide can release the conveying connection, whereas it can close the conveying connection in the second end position. If the slide closes the conveying connection, a solid material supply within the solid material feeding apparatus is disconnected spatially from downstream regions, in particular from a mixing chamber of a mixing apparatus which is connected to the solid material feeding apparatus. It can thus be prevented by way of the slide that the solid material comes into contact with a liquid which is present or circulates in the mixing apparatus.

The funnel can also very generally and in accordance with its function be called a solid material receiving element of the solid material feeding apparatus. It serves to receive solid material from an upstream section, for example from a chute and/or from a supply sack, and to feed it to the downstream conveying sections of the conveying feeding apparatus.

It is particularly advantageous if the slide fills a clear cross section of the conveying connection and/or of the solid material outlet. It is possible in this way to sweep the entire clear cross section of the conveying connection and/or of the solid material outlet of the solid material feeding apparatus by way of the slide, and to detach material which possibly adheres there.

In order to ensure that the conveying connection and also the solid material outlet can be swept completely by way of the slide, it is advantageous if, in its second end position, the slide protrudes out of the solid material outlet an/or has an overhang with respect to the solid material outlet. In this way, material which adheres even in the region of the solid material outlet can be swept and detached reliably by the slide.

It can be particularly advantageous if the overhang which the slide has in its second end position with respect to the solid material outlet is as great as a distance between an inlet cross section into a solid material inlet and an orifice cross section of the solid material inlet into a mixing chamber of a mixing apparatus which can be connected to the solid material feeding apparatus.

It is provided in the case of one particularly advantageous embodiment of the solid material feeding apparatus that the slide is a piston of a piston valve. Said piston valve can be mounted downstream of the funnel in the conveying direction of the solid material through the solid material feeding apparatus.

The piston valve can have a housing which forms at least one section of the conveying connection between the funnel and the solid material outlet. It is particularly advantageous if the piston valve has a housing which forms the entire conveying connection between the funnel and the solid material outlet. The solid material outlet can also be arranged or configured on the housing of the abovementioned piston valve.

The funnel of the solid material feeding apparatus can have a funnel outlet which opens into the conveying connection. If the conveying connection is formed at least in part by a (for example, the abovementioned) housing of a (for example, the abovementioned) piston valve, the funnel outlet can also open directly into the housing of the piston valve.

Here, a mouth of the funnel outlet into the housing can be arranged between the first end position and the second end position of the slide. The solid material thus passes on a direct path out of the funnel into the conveying connection between the funnel and the solid material outlet of the solid material feeding apparatus. It can be ensured on the basis of the arrangement of the mouth of the funnel outlet into the housing between the first end position and the second end position of the slide that that entire region of the conveying connection of the solid material feeding apparatus which comes into contact with solid material between the funnel and the solid material outlet can be swept and cleared by the slide.

In a further refinement of the invention, the funnel outlet is arranged within the conveying connection, and the slide can be moved through the mouth of the funnel outlet. In said refinement, the funnel outlet is connected directly to the conveying connection without further intermediate connections. The slide can be moved through the funnel outlet between the first and the second end position. As a result, any powder clumps in the funnel outlet can be cleared by way of the slide. Clogging is thus avoided. Furthermore, the solid material which is situated in front of the feed to the conveying connection in the funnel can always be moved by way of, for example, an agitator blade of the loosener, with the result that no powder clumps or clogging can be formed even just before the entry of the solid material into the conveying connection. Therefore, there is no "dead space", that is to say there are no points in the solid material feeding apparatus which could not be reached by the loosener or the slide and therefore could not be freed mechanically from clogging.

In order for it to be possible for potential adhesions of solid material to be avoided or detached in the entire conveying path which is provided by the solid material feeding apparatus, furthermore, the solid material feeding apparatus can have a solid material loosener and/or a fluidizer and/or a vibrator and/or a knocker, in particular a pneumatic knocker. Said abovementioned functional units of the solid material feeding apparatus which are provided for avoiding and/or detaching adhesions can be arranged or configured, in particular, in or on the funnel.

A fluidizer is understood to mean a functional element which is used for loosening solid material, in particular powder. Here, the fluidizer is set up to blow air into a conveying element, for example a pipeline and/or the abovementioned funnel, of the solid material feeding apparatus, in order to loosen and/or to detach solid material which is present there, in particular powder. In this way, the solid material, in particular the powder, can be loosened in such a way that it flows more readily and can be moved more readily by way of the solid material feeding apparatus. Here, the abovementioned fluidizer can preferably also be arranged or configured in the region of the funnel of the solid material feeding apparatus.

Furthermore, the elements of the solid material feeding apparatus which come into contact with the solid material to be fed, that is to say, in particular, the abovementioned funnel and the abovementioned conveying connection, and also the solid material outlet of the solid material feeding apparatus, can be provided with an anti-adhesion coating or can consist of materials which have a comparatively low adhesion effect on solid materials to be fed.

Moreover, the solid material feeding apparatus can have a slide drive. The slide drive serves to move the slide to and fro between the first end position and the second end position. Here, the slide drive can be a pneumatic and/or electric slide drive.

It is particularly advantageous if the abovementioned slide drive has a spindle, by way of which the slide can be displaced between the first end position and the second end position. The use of a spindle has the advantage that the slide can be moved to and fro through the conveying connection between the solid material outlet and the funnel by way of a comparatively high and, above all, homogeneous force. In this way, even stubborn adhesions within the conveying connection can be detached, which stubborn adhesions can be detached only by way of a comparatively high application of force.

Furthermore, it is possible that the slide drive has a gear mechanism, in particular a step-down gear mechanism, which is connected to a, in particular the abovementioned, spindle. The use of a step-down gear mechanism has the advantage that the force, by way of which the slide can be moved through the conveying connection, can be increased in a comparatively simple manner. The slide drive can thus be of correspondingly small or weak dimensions, without it being necessary for force losses to occur in the case of the actuation of the slide.

According to the invention, the solid material feeding apparatus has a monitoring apparatus which is set up for the detection of clogging of the conveying connection. Furthermore, the solid material feeding apparatus, in particular its monitoring apparatus, can have a monitoring sensor, by way of which any clogging of the conveying connection can be detected at least indirectly. The monitoring sensor can be a pressure sensor which, in the use position, can be arranged, for example, in the conveying connection or in a mixing chamber of the mixing apparatus, to which the solid material feeding apparatus is connected.

The above-mentioned solid material feeding apparatus is set up to carry out the method as claimed in one of the claims which are directed to a method for feeding solid material to a mixing apparatus.

In order to achieve the object, a mixing arrangement of the type mentioned at the outset, comprising at least one mixing apparatus and at least one solid material feeding apparatus as claimed in one of the claims which are directed to a solid material feeding apparatus of this type, is also proposed.

The at least one mixing apparatus can be a solid/liquid mixing apparatus. The mixing apparatus can have a rotor/stator unit which is arranged in a mixing chamber of the mixing apparatus. By way of a rotor/stator unit of this type, solid materials can be mixed particularly thoroughly with liquids. Moreover, a suction effect can be produced in the case of operation of a rotor/stator unit of this type, by way of which suction effect solid material can be sucked out of the solid material feeding apparatus into the mixing chamber of the mixing apparatus. This is the case, in particular, when the conveying connection of the solid material feeding apparatus to the mixing apparatus is released in the case of a slide which is situated in the first end position. This is the case, for example, when the above-described piston valve is opened.

The at least one mixing apparatus can have a solid material inlet which is connected to the solid material outlet of the at least one solid material feeding apparatus of the mixing arrangement. The solid material inlet can open via an orifice cross section directly into a mixing chamber of the mixing apparatus.

In its second end position, the slide of the at least one feeding apparatus can fill the orifice cross section and/or can protrude out of the orifice cross section into the mixing chamber. In this way, it is possible for that solid material inlet of the mixing apparatus, to which the solid material feeding apparatus is connected, to be cleared with the aid of the slide of the solid material feeding apparatus and for solid material which possibly adheres there to be removed.

An overhang which the slide has in its second end position relative to the solid material outlet of the solid material feeding apparatus can expediently be as great as a distance between an inlet cross section into the solid material inlet and an, for example the abovementioned, orifice cross section of the solid material inlet into a, for example into the abovementioned, mixing chamber. It is thus ensured that, in its second end position, the slide can reach as far as into the orifice cross section of the solid material outlet, in order for it to be possible for the entire conveying path between the funnel and the mixing chamber to be cleared and also closed as required.

In this way, a mixing arrangement is produced, in the case of which the conveying connection between the solid material feeding apparatus and the mixing apparatus can be freed of adhesions and clogging as required during the operation of the mixing arrangement. This allows particularly efficient utilization of the mixing arrangement, and helps to avoid unplanned downtimes.

The abovementioned mixing arrangement can be set up to carry out the method for feeding solid material as claimed in one of the claims which are directed to a method of this type.

Finally, the object mentioned at the outset is also achieved by way of the use of a solid material feeding apparatus and/or a mixing arrangement as claimed in one of the claims which are directed to a solid material feeding apparatus and/or a mixing arrangement of this type when carrying out the method for feeding solid material as claimed in one of the claims which are directed to a method of this type.

The invention will now be described in greater detail on the basis of one exemplary embodiment, but is not restricted to said exemplary embodiment. Further exemplary embodiments result by way of a combination of the features of individual or multiple patent claims among one another and/or in a combination of individual or multiple features of the exemplary embodiment. In the drawing, in a partially greatly diagrammatic illustration:

DRAWINGS

Figure 2:
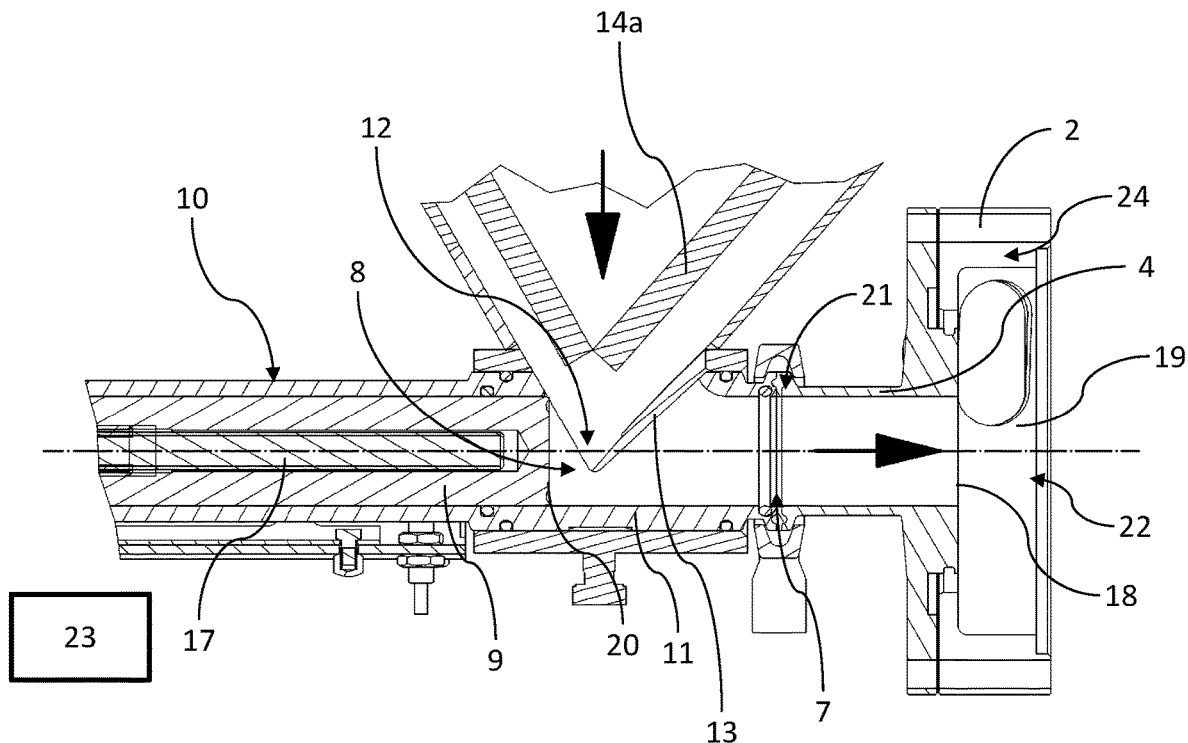
Figure 3:
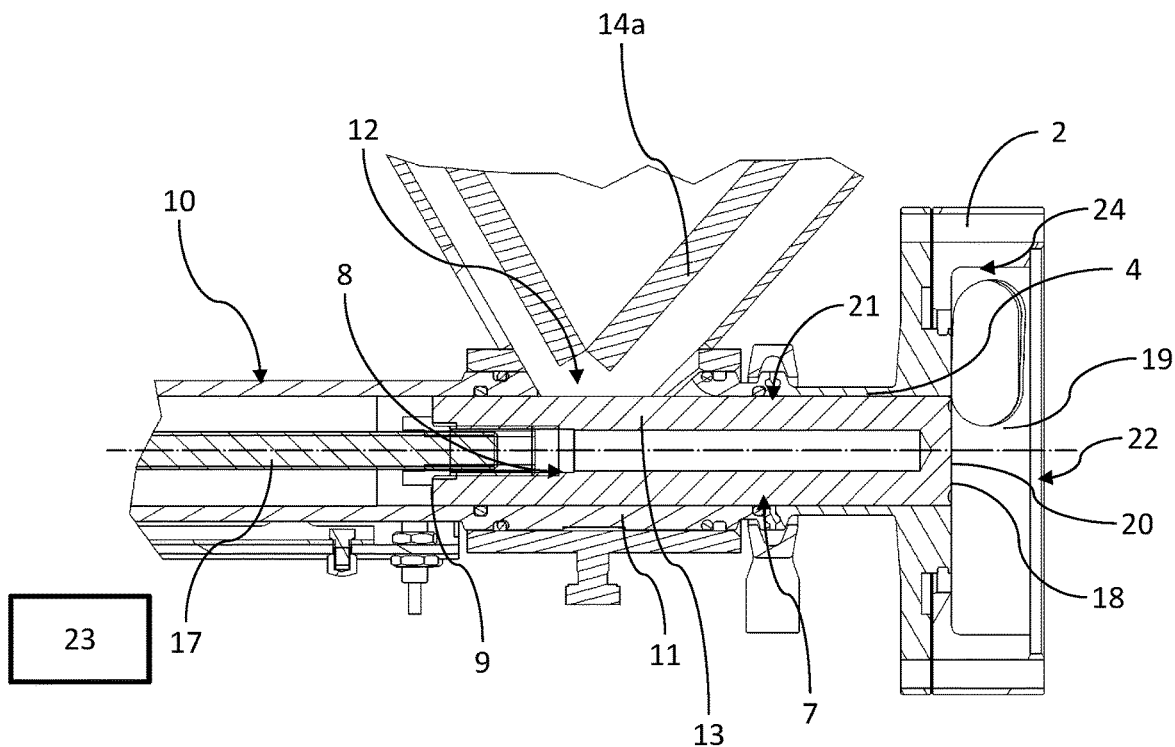

FIG. 1 shows a side view of a mixing arrangement with a solid material feeding apparatus and a mixing apparatus which is connected thereto, FIG. 2 shows a side view, sectioned along the sectional line D to D, of a conveying connection between a funnel and a solid material outlet of the solid material feeding apparatus, a slide of the solid material feeding apparatus being situated in its first end position, with the result that the conveying connection is open, and FIG. 3 shows a sectioned side view of the conveying connection shown in FIG. 2 with a slide which is situated in its second end position.

DETAILED DESCRIPTION

FIGS. 1 to 3 show at least parts of a mixing arrangement (denoted in its entirety by 1) for mixing solid materials into liquids. The mixing arrangement 1 comprises a mixing apparatus 2 and a solid material feeding apparatus 3 which is connected thereto. Via the solid material feeding apparatus 3, the mixing apparatus 2 can be fed solid material, for example powder.

The mixing apparatus 2 which is shown in the figures is a solid/liquid mixing apparatus. Via a connector (not shown), the mixing apparatus 2 is supplied with liquid, into which the solid material is to be mixed. The mixing apparatus 2 has a solid material inlet 4, to which the solid material feeding apparatus 3 is connected. The solid material feeding apparatus 3 serves to feed solid material, in particular bulk material, for example powder, to the mixing apparatus 2.

The solid material feeding apparatus 3 has a funnel 5. The funnel 5 serves to receive solid material. According to FIG. 1, an emptying apparatus 6 is arranged above the funnel 5. With the aid of said emptying apparatus 6, solid materials can be filled from big bags into the funnel 5 of the solid material feeding apparatus 3.

Furthermore, the solid material feeding apparatus 3 has a solid material outlet 7 which can be connected to the abovementioned solid material inlet 4 of the mixing apparatus 2 and is connected according to FIGS. 1 to 3.

The solid material outlet 7 of the solid material feeding apparatus 3 is connected via a conveying connection 8 to the funnel 5.

The solid material feeding apparatus 3 has a slide 9 which can be moved through the conveying connection 8 between a first end position (cf. FIG. 2) and a second end position (cf. FIG. 3). Here, the spacing of the two end positions is selected in such a way that the slide 9 can be moved through the entire conveying path of the conveying connection 8.

The sectional illustrations of FIGS. 2 and 3 clarify that the slide 9 has completely filled a clear cross section of the conveying connection 8 and also a clear cross section of the solid material outlet 7 of the solid material feeding apparatus 2. According to FIG. 3, in its second end position, the slide 9 protrudes out of the solid material outlet 7 of the solid material feeding apparatus 2. In its second end position according to FIG. 3, the slide 9 is pushed out of the solid material outlet 7 of the solid material feeding apparatus 2 to such an extent that it protrudes into the solid material inlet 4 of the mixing apparatus 2 and also fills said solid material inlet 4 completely.

Here, an overhang which the slide 9 has with respect to the solid material outlet 7 in its second end position is as great as a distance between an inlet cross section 21 in the solid material inlet 4 and an orifice cross section 18 of the solid material inlet 4 into a mixing chamber 19 of the mixing apparatus 2 which is connected to the solid material feeding apparatus 3.

The solid material inlet 4 of the mixing apparatus 2 is configured as a tubular connection piece.

The slide 9 of the solid material feeding apparatus 3 is a piston of a piston valve 10. The piston valve 10 is mounted downstream of the funnel 5 of the solid material feeding apparatus 3 in the conveying direction of the solid material through the solid material feeding apparatus 3. The piston valve 10 has a housing 11. The housing 11 forms not only the entire conveying connection 8 between the funnel 5 and the solid material outlet 7 of the solid material feeding apparatus 3, but also has the solid material outlet 7.

The funnel 5 comprises a funnel outlet 12 which opens directly into the housing 11 of the piston valve 10. Here, a mouth 13 of the funnel outlet 12 into the housing 11 of the piston valve 10 is arranged between the first end position and the second end position of the slide 9. The funnel outlet 12 is arranged within the conveying connection 8, that is to say within the housing 11. The mouth 13 of the funnel outlet 12 is enclosed at least partially by the housing 11. The slide 9 can be moved through the mouth 13 of the funnel outlet 12. As a result, the housing 11 is connected directly to the funnel 5.

Furthermore, the solid material feeding apparatus 3 comprises a solid material loosener 14 which, within the funnel 5, ensures that the solid material which is situated therein remains sufficiently loose and therefore flowable. The solid material loosener 14 has a drive 15. Via the drive 15, blades 14a (shown in section in FIGS. 2 and 3) of the solid material loosener 14 can be rotated within the funnel 5, in order to loosen or keep loose solid material which is situated therein. A rotational axis R of the solid material loosener 14 is indicated in FIG. 1.

The solid material feeding apparatus 3 has a slide drive 16. The slide drive 16 can be configured, for example, as a pneumatic or else as an electric slide drive. Pneumatic or electric slide drives are particularly suitable, in particular, for applications in the food and/or pharmaceutical field on account of the hygienic requirements which are in place there. In principle, the use of hydraulic slide drives would also be conceivable.

The slide drive 16 is connected via a spindle 17 to the slide 9. With the aid of the spindle 17, the slide 9 can be moved to and fro between the first end position and the second end position. Furthermore, the slide drive 16 can have a gear mechanism (not shown in the figures) which can preferably be configured as a step-down gear mechanism. Via the gear mechanism, the slide drive 16 is then connected to the spindle 17.

The sectional illustrations of FIGS. 2 and 3 clarify that the solid material outlet 7 of the solid material feeding apparatus 3 is connected to the solid material inlet 4 of the mixing apparatus 2. The solid material inlet 4 has an orifice cross section 18 directly into a mixing chamber 19 of the mixing apparatus 2. Via said orifice cross section 18, solid material which is fed in via the solid material inlet 4 can be introduced directly into the mixing chamber 19 of the mixing apparatus 2. In its second end position, the slide 9 of the solid material feeding apparatus 3 reaches as far as into the orifice cross section 18 of the solid material inlet 4 of the mixing apparatus 2, and fills said orifice cross section 18 completely (cf. FIG. 3). An end side 20 of the slide 9 closes the orifice cross section 18 of the solid material inlet 4 in a manner which is flush against the wall when the slide 9 has reached its second end position according to FIG. 3. It is ensured in this way that the complete conveying path which is provided by the conveying connection 8, the solid material outlet 7 and the solid material inlet 4 is swept by the slide 9 and can be freed from adhesions as required.

FIG. 3 clarifies that an overhang which the slide 9 has in its second end position relative to the solid material outlet 7 is as great as a distance between an inlet cross section 21 into the solid material inlet 4 and the orifice cross section 18 of the solid material inlet 4 into the mixing chamber 19.

The solid material feeding apparatus 3 has a monitoring apparatus 23. The monitoring apparatus 23 is set up for the detection of clogging of the conveying connection 8. In the case of one embodiment of the solid material feeding apparatus 3, the monitoring apparatus 23 can be connected to a monitoring sensor 24 in the form of a pressure sensor. The monitoring sensor 24 can be arranged in the mixing chamber 19 of the mixing apparatus 2 or else in the conveying connection 8. The rotor/stator unit 22 of the mixing apparatus 2 is set up to generate a vacuum in the mixing chamber 19. By way of the vacuum, the solid material is conveyed through the conveying connection 8 of the solid material feeding apparatus 3 into the mixing chamber 19 of the mixing apparatus 2. As soon as the conveying connection 8 is clogged by way of adhesions of solid material, the monitoring sensor 24 can detect a pressure drop in the mixing chamber 19 or in the conveying connection 8.

Furthermore, the monitoring apparatus 23 can also monitor a power consumption of a drive of the rotor/stator unit 22. If a drop in the power consumption of the drive can be detected, this can indicate clogging of the conveying connection 8, and the slide 9 can be activated.

The mixing arrangement 1 and the solid material feeding apparatus 3 are set up to carry out the method which is described in the following text:

Here, solid material, for example bulk material in the form of a powder, is fed to the mixing apparatus 2 with the use of the solid material feeding apparatus 3. Here, the solid material passes via the conveying connection 8 of the solid material feeding apparatus 3 into the mixing apparatus 2 and, in particular, into the mixing chamber 19 of the mixing apparatus 2 here. As has already been indicated above, the solid material feeding apparatus 3 has the slide 9. Said slide 9 can be moved through the conveying connection 8 between its first end position and its second end position, and is set up to detach adhesions of solid material within the conveying connection 8. The slide 9 is activated and is moved through the conveying connection 8, in order to clear the conveying connection 8, as soon as the conveying connection 8 is clogged between the solid material outlet 7 and the funnel 5. In order to move the slide 9 through the conveying connection 8, the slide drive 16 is actuated and is activated correspondingly.

In the case of the mixing arrangement 1 which is shown in the figures, the solid material is conveyed with the aid of vacuum into the mixing chamber 19 of the mixing apparatus 2, namely is sucked in. The vacuum, by way of which the solid material is sucked in, is generated with the aid of the rotor/stator unit 22 of the mixing apparatus 2. The conveying connection 8 is monitored for clogging by way of the monitoring apparatus 23 of the solid material feeding apparatus 3. The monitoring apparatus 23 activates the slide 9 at least indirectly, as soon as clogging of the conveying connection 8 is detected. In this way, the method can be carried out in an automated manner.

The clogging of the conveying connection 8 can be detected, for example, on the basis of a drop of the power consumption of a drive of the rotor/stator unit 22. It is also possible for the clogging of the conveying connection 8 to be detected on the basis of a pressure change in the conveying connection 8 and/or in the mixing chamber 19 of the mixing apparatus 2. For this purpose, one or more monitoring sensors 24 (configured, for example, as pressure sensors) of the monitoring apparatus 23 can be used.

The invention is concerned with improvements in the technical field of the feeding of solid materials to mixing apparatuses. For this purpose, inter alia, the solid material feeding apparatus 3 is proposed. Said solid material feeding apparatus 3 has the slide 9 which can be moved between a first end position and a second end position through a conveying connection 8 which is arranged between a funnel 5 and a solid material outlet 7 of the solid material feeding apparatus 3. With the aid of the slide 9, adhesions within the conveying connection 8 can be detached, without dismantling of the conveying connection 8 being necessary.

The invention claimed is:

1. A method for feeding solid bulk material that includes powder, to a mixing apparatus with the use of a solid material feeding apparatus, the solid material feeding apparatus having a funnel for receiving the solid bulk material and a solid material outlet which is connected to a solid material inlet of the mixing apparatus, the solid material outlet and the funnel being connected to one another via a conveying connection, the solid bulk material being fed to the mixing apparatus via the conveying connection, the solid material feeding apparatus having a slide which can be moved through the conveying connection between a first end position and a second end position, wherein the slide is set up to detach adhesions of solid bulk material within the conveying connection, and in that the slide is activated and is moved through the conveying connection, in order to clear the conveying connection, as soon as the conveying connection is clogged between the solid material outlet and the funnel, clogging of the conveying connection being detected by a monitoring apparatus, the monitoring apparatus activating the slide at least indirectly, as soon as clogging of the conveying connection is detected, the solid bulk material being conveyed through suction with the aid of a vacuum into a mixing chamber of the mixing apparatus, the vacuum being generated by a rotor/stator unit of the mixing apparatus.

2. The method of claim 1, wherein clogging of the conveying connection is detected on the basis of a drop in the power consumption of a drive of the rotor/stator unit by a monitoring sensor that includes a pressure sensor, on the basis of a pressure change in the conveying connection and/or in the mixing chamber of the mixing apparatus.

3. The method of claim 1 wherein the slide fills a clear cross section of the conveying connection and/or of the solid material outlet, and/or in that, in its second end position, the slide protrudes out of the solid material outlet and/or has an overhang with respect to the solid material outlet, the overhang which the slide has in its second end position with respect to the solid material outlet being as great as a distance between an inlet cross section into a solid material inlet and an orifice cross section of the solid material inlet into the mixing chamber of the mixing apparatus which can be connected to the solid material feeding apparatus.

* * * * *